United States Patent
Ugarte Carcoba et al.

(10) Patent No.: US 11,708,185 B2
(45) Date of Patent: Jul. 25, 2023

(54) MODIFIED ATMOSPHERE PACKAGING MACHINE

(71) Applicant: ULMA Packaging, S. Coop., Oñati (ES)

(72) Inventors: Diego Ugarte Carcoba, Oñati (ES); Ander Madinabeitia Fernandez, Oñati (ES); Eneko Izquierdo Ereño, Oñati (ES)

(73) Assignee: ULMA PACKAGING TECHNOLOGICAL CENTER, S COOP., Onati (ES)

( * ) Notice: Subject to any disclaimer, the term of this patent is extended or adjusted under 35 U.S.C. 154(b) by 0 days.

(21) Appl. No.: 17/519,972

(22) Filed: Nov. 5, 2021

(65) Prior Publication Data

US 2022/0161950 A1  May 26, 2022

(30) Foreign Application Priority Data

Nov. 20, 2020  (EP) .................................... 20383015

(51) Int. Cl.
*B65B 31/02* (2006.01)
*B65B 7/16* (2006.01)

(52) U.S. Cl.
CPC ............ *B65B 31/028* (2013.01); *B65B 7/164* (2013.01)

(58) Field of Classification Search
CPC ....... B65B 7/164; B65B 31/02; B65B 31/021; B65B 31/025; B65B 31/028; B29C 65/7441; B29C 66/001; B29C 66/00145
USPC .................................................. 53/433, 511
See application file for complete search history.

(56) References Cited

U.S. PATENT DOCUMENTS

| 3,343,333 A | * | 9/1967 | Mahaffy et al. | ...... B65B 25/067 53/511 |
| 3,481,100 A | * | 12/1969 | Bergstrom | .............. B65B 31/02 53/433 |
| 3,659,393 A | * | 5/1972 | Richter | ................. B65B 31/021 53/511 |
| 5,419,096 A |   | 5/1995 | Gorlich | |

(Continued)

FOREIGN PATENT DOCUMENTS

| EP | 0489797 A1 | 6/1992 | |
| EP | 1810815 A2 | * 7/2007 | ........... B65B 31/028 |
| EP | 1908689 A2 | 4/2008 | |

OTHER PUBLICATIONS

Extended European Search Report in European Application No. 20383015.3, dateed Jun. 5, 2021, 7 pages.

*Primary Examiner* — Stephen F. Gerrity
(74) *Attorney, Agent, or Firm* — Edell, Shapiro & Finnan, LLC (57) ABSTRACT

Provided is packaging machine with a sealing station that includes a mold with an upper tool and a lower tool facing each other and suitable for cooperating with one another in an operative position of the mold, between which there is delimited an inner area. The lower tool includes a cavity that is configured to receive a tray. A gas injection opening is located adjacent to a first side of the cavity and communicated with the inner area. The upper tool includes a sealing tool and an actuator device facing an actuation region of the lower tool defined between the first side of the cavity and a contact location of the upper and lower tools, and being closer to the lower tool than the sealing tool.

16 Claims, 9 Drawing Sheets

(56) References Cited

U.S. PATENT DOCUMENTS

| | | | | |
|---|---|---|---|---|
| 5,689,937 A | * | 11/1997 | Gorlich et al. | ....... B65B 31/028 |
| | | | | 53/433 |
| 7,600,358 B2 | * | 10/2009 | Natterer | .................. B65B 7/164 |
| | | | | 53/433 |
| 2008/0104930 A1 | | 5/2008 | Sparakowski et al. | |
| 2011/0072764 A1 | | 3/2011 | Daniek et al. | |
| 2012/0144785 A1 | * | 6/2012 | Vaccari | .................. B65B 31/028 |
| | | | | 53/510 |
| 2013/0247510 A1 | | 9/2013 | Harlacher et al. | |
| 2019/0062032 A1 | * | 2/2019 | Mader et al. | ......... B65B 31/028 |
| 2019/0382144 A1 | * | 12/2019 | Capitani | ................. B65B 7/164 |

\* cited by examiner

MODIFIED ATMOSPHERE PACKAGING MACHINE

CROSS-REFERENCE TO RELATED APPLICATIONS

This application relates to and claims the benefit and priority to European Application No. EP20383015.3, filed Nov. 20, 2020.

TECHNICAL FIELD

The present invention relates to modified atmosphere packaging machines, and more specifically to packaging machines in which packaging is performed in trays and comprising a sealing station suitable for injecting a gas between a cover film and the corresponding tray and for sealing the cover film to a flap of said tray.

BACKGROUND

Modified atmosphere packaging machines comprise a sealing station with a mold comprising an upper tool and a lower tool facing each other and cooperating with one another.

The sealing station receives at least one tray housed in a cavity of the lower tool, and one cover film positioned on the tray for sealing it to the flap of the tray. The upper and lower tools cooperate with one another for generating an inner area between both, with a contour delimited. To enable packaging the products arranged in the tray with a modified atmosphere, a gas is injected in the inner area towards said tray, such that the air present in the tray is replaced with said gas. At the same time, the air is discharged from said inner area as the gas is injected. When a required amount of gas has been injected, a hot sealing tool which is attached with freedom of movement to the upper tool is moved towards the lower tool for pressing the cover film against the flap of the tray and causing the heat sealing.

US20130247510A1 discloses a modified atmosphere packaging machine, where the lower tool comprises a cavity for supporting the tray (both the body and the flap of the tray), with said cavity being at a level lower than the outer surface of the lower tool. Therefore, there extends from the cavity a wall surrounding said cavity, and said wall comprises openings through which the gas is injected towards the cavity. This requires a greater separation between said cavity and the upper tool, so greater travel of the sealing tool is necessary to enable sealing a cover film to the tray. Furthermore, based on the type of tray used or on the actual arrangement of the tray in the cavity, the wall is required to have a given extension to ensure that the communication between said openings and the tray arranged in said cavity does not become blocked.

US20110072764A1 discloses a modified atmosphere packaging machine, with a wall after the cavity of the lower tool, but in this case the injection openings are not in said wall. As a result of the wall, a greater distance is provided between the tray arranged in the cavity and the upper tool, the distance between the cover film and the tray being increased so as to ensure that the gas passage to the tray does not become blocked.

SUMMARY

Disclosed is a modified atmosphere packaging machine. According to one embodiment the packaging machine comprises a sealing station which is suitable for receiving at least one tray and one cover film, for injecting a gas between the cover film and the tray and for sealing said cover film to a flap of said tray. The sealing station comprises a mold with an upper tool and a lower tool facing each other and suitable for cooperating with one another in an operative position of the mold, such that with the mold in said operative position there is delimited an inner area between both tools with a given perimeter contour. The perimeter contour corresponds with the inner region where both tools cooperate with one another for holding the cover film or with the inner region where both tools contact one another (in the event that the cover film is held above the contact region between said tools).

The upper tool comprises a sealing tool movable between a sealing position and an inoperative position, with the mold in the operative position. The sealing tool is closer to the lower tool when it is in the operative position, so for sealing the cover film to the flap of a tray said sealing tool is moved from the inoperative position to the sealing position thereby confining said cover film and said tray against the lower tool.

The lower tool comprises at least one cavity with a plurality of sides. The lower tool faces the upper tool and is sized for receiving the body of a tray. The lower tool also comprises at least one gas injection opening arranged outside the cavity, adjacent to a first side of said cavity and communicated with the inner area when the mold is in the operative position. This allows gas to be injected into the cavity, and therefore into the tray, to perform packaging with modified atmosphere packaging. The injection of gas is performed with the sealing tool in the inoperative position, given that when said sealing tool is in the sealing position it does not allow the communication between the injection opening and the cavity.

The upper tool comprises at least one actuator device facing at least one point of an actuation region of the lower tool defined between the first side of the cavity and a first segment of the perimeter of the inner area facing said first side. This region is where the flap of the tray will be located, such that the actuator device is facing the flap of a tray when said tray is arranged in the cavity. The actuation region is also referred to herein as the flap support surface. The actuator device is closer to the lower tool than what the sealing tool when the mold is in the operative position and said sealing tool is in the inoperative position, such that it can act against said tray (more specifically, against said flap of the tray) before the sealing tool does, i.e., during the injection of gas through the injection opening.

Therefore, when a tray is arranged in the cavity of the lower mold the flap is arranged on the actuation region of the lower tool. Due to the material, the constructive process and/or the design of the tray, the flap may not be horizontal once the body of the tray is arranged in the cavity and may be lifted towards the upper tool, such that when the mold is in the operative position and holds a cover film on the tray, said flap may contact the cover film by blocking the communication between the injection opening and the cavity. This prevents the flow of gas from the injection opening to the cavity where the body of the tray is arranged. It is also possible for the actual gas injected through the injection openings to cause the flap to move by contacting said flap with the cover film and hindering the flow of gas. However, as a result of the actuator device the movement or the positioning of the flap towards the upper tool (towards the cover film) is limited, with the limit of said movement or positioning being the point where said flap contacts the actuator device. As said contact occurs at a level lower than where the sealing tool is located, there is room between said point and said sealing tool through which the gas can pass, if needed. It thereby ensures that the communication between the injection opening and the cavity is always enabled when required, without it being necessary to that end to increase the height of the mold and/or increase the travel of the sealing tool.

In the best case scenario, the actuator device does not contact the cover film below the holding plane of the cover film, so when the mold is in the operative position and the sealing tool is in the inoperative position, the flap never reaches that the plane of the cover film and the passage of gas between said flap and the cover film is always enabled.

In the worst case scenario, even though the actuator device is above the holding plane of the cover film pressing said cover film downwards when the mold is in the operative position and the sealing tool is in the inoperative position, as it is below the sealing tool, the actual pressure of the gas may push the cover film upwards and there will always be a gap between the flap (which will move upwards at most up to the actuator device) and the cover film (which will move upwards at most up to the sealing tool) which allows said communication.

Therefore, the function of the actuator device is to prevent the flap from closing the communication between the injection opening and the cavity, acting to that end on said flap (either by pushing it downwards or else by preventing it from moving upwards after a certain point).

The invention is particularly advantageous when trays manufactured with deformable flaps, trays with at least one cellulose material, and/or trays manufactured with at least one sheet of cardboard are used, where the properties of the tray and/or the weight of the product to be packaged arranged in said tray may cause the flap of the tray to be lifted. As a result of the proposal, a more reliable and more versatile modified atmosphere packaging machine, capable of ensuring the correct packaging in trays of any type is obtained.

These and other advantages and features will become apparent in view of the figures and detailed description.

DETAILED DESCRIPTION

Figure 1:
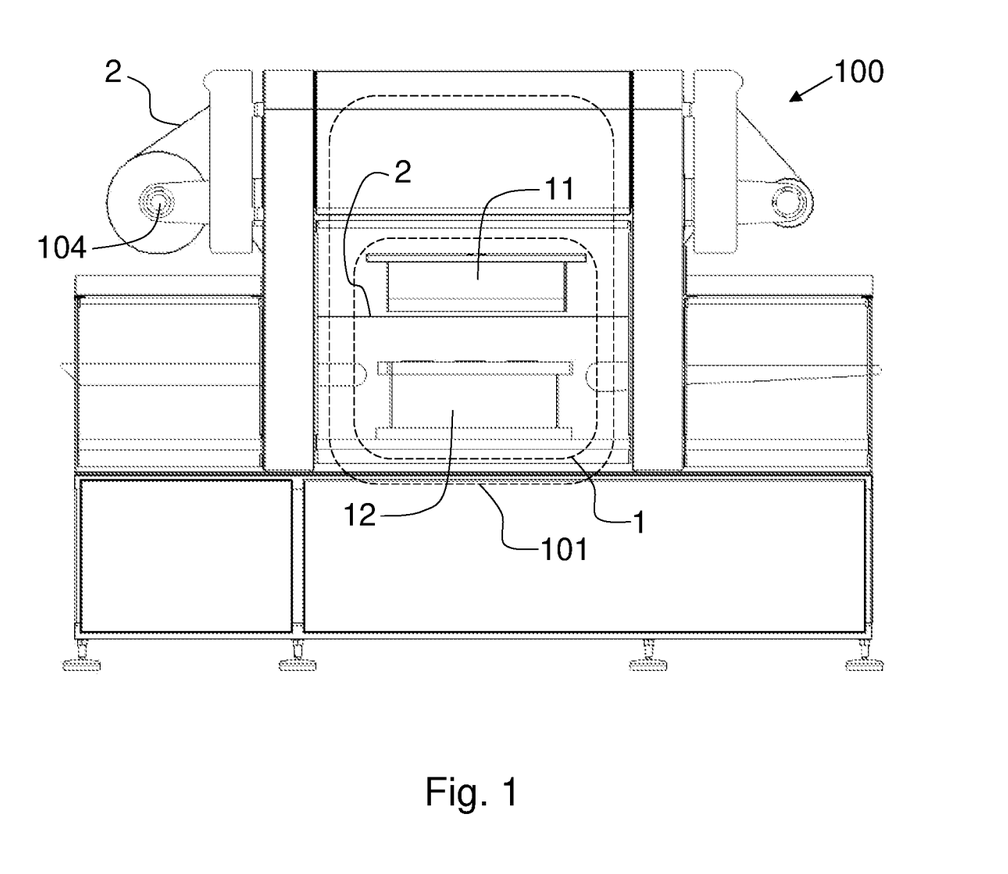
FIG. 1 schematically shows in a simplified manner a packaging machine according to one embodiment.

FIG. 1 shows a simplified embodiment of the modified atmosphere packaging machine 100, in which packaging is performed in trays 3 comprising a body 3.0 surrounded by a flap 3.1. The machine 100 comprises a sealing station 101 suitable for receiving a cover film 2 and at least one tray 3 and for injecting a gas between the cover film 2 and the tray 3 and for sealing said cover film 2 to the flap 3.1 of said tray 3. Packaging machines 100 suitable for performing said sealing are known as heat sealing machines.

Figure 2:
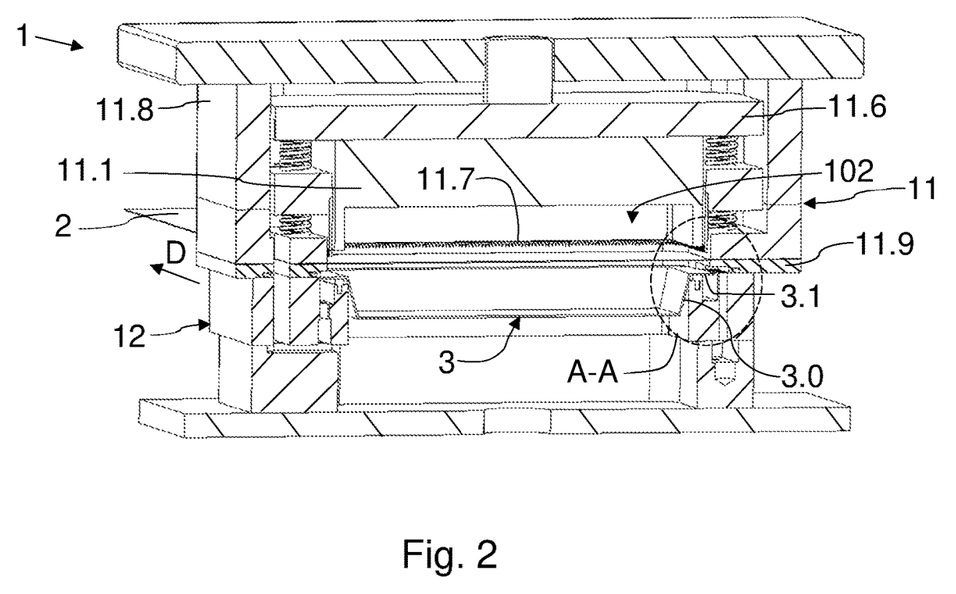
FIG. 2 shows a front section view of a mold of an embodiment of the packaging machine, with the mold in an operative position.
Figure 3:
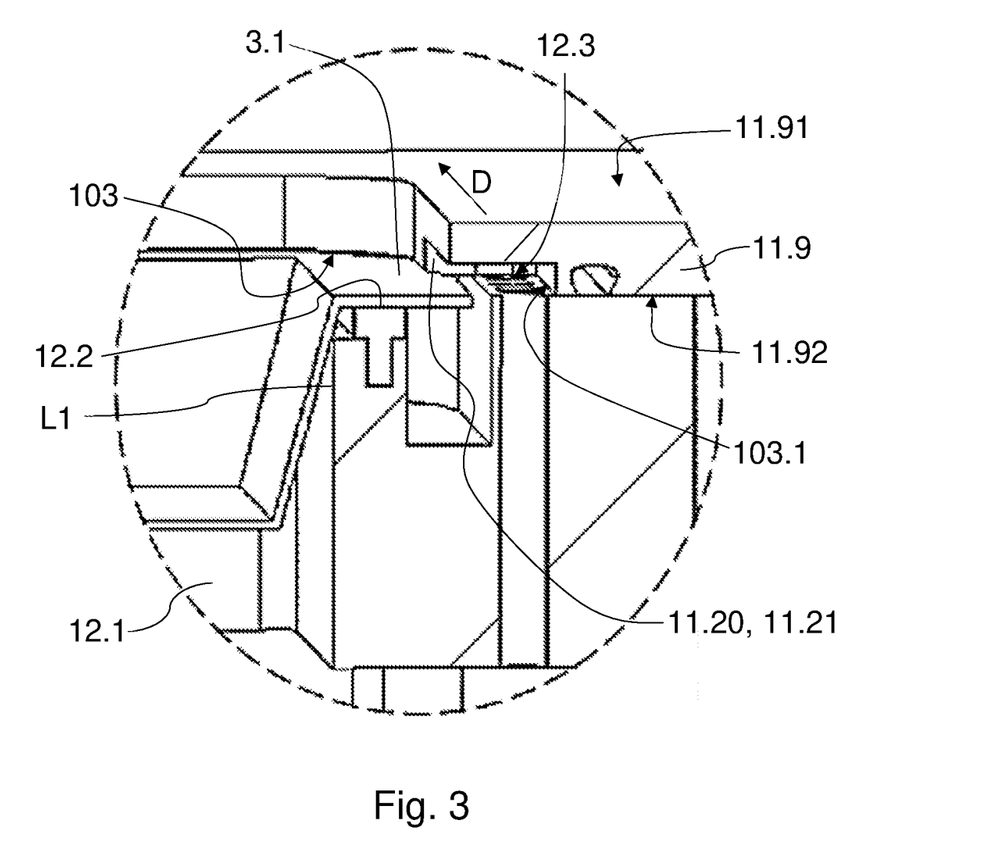
FIG. 3 shows detail A-A of FIG. 2.
Figure 4:
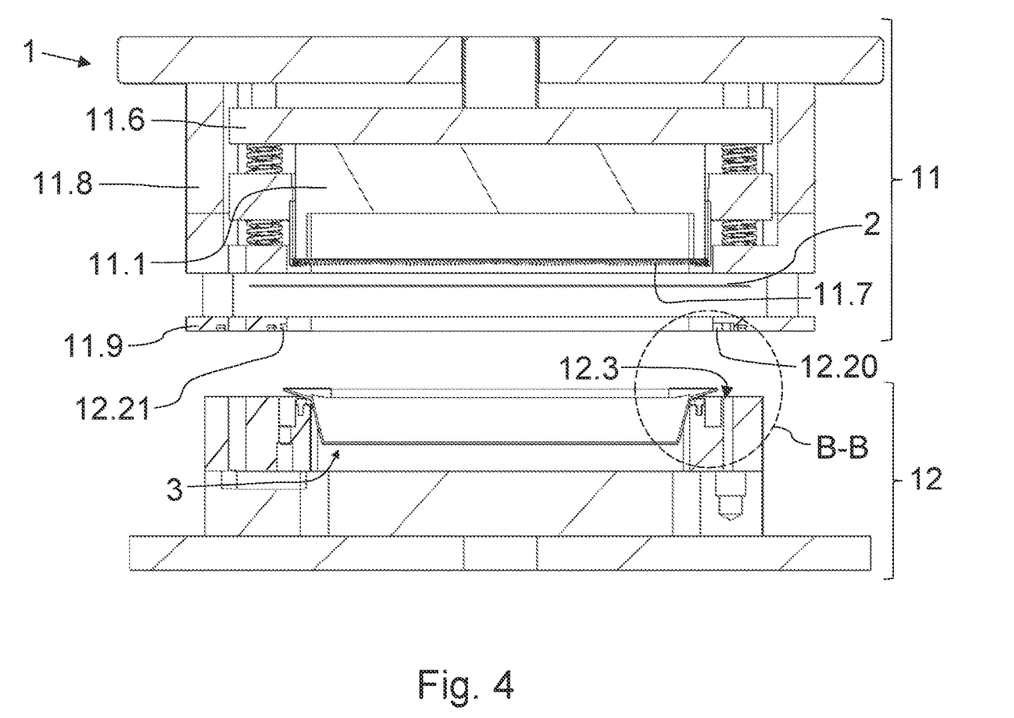
FIG. 4 shows a front section view of the mold of FIG. 2, with the mold in an inoperative position.
Figure 5:
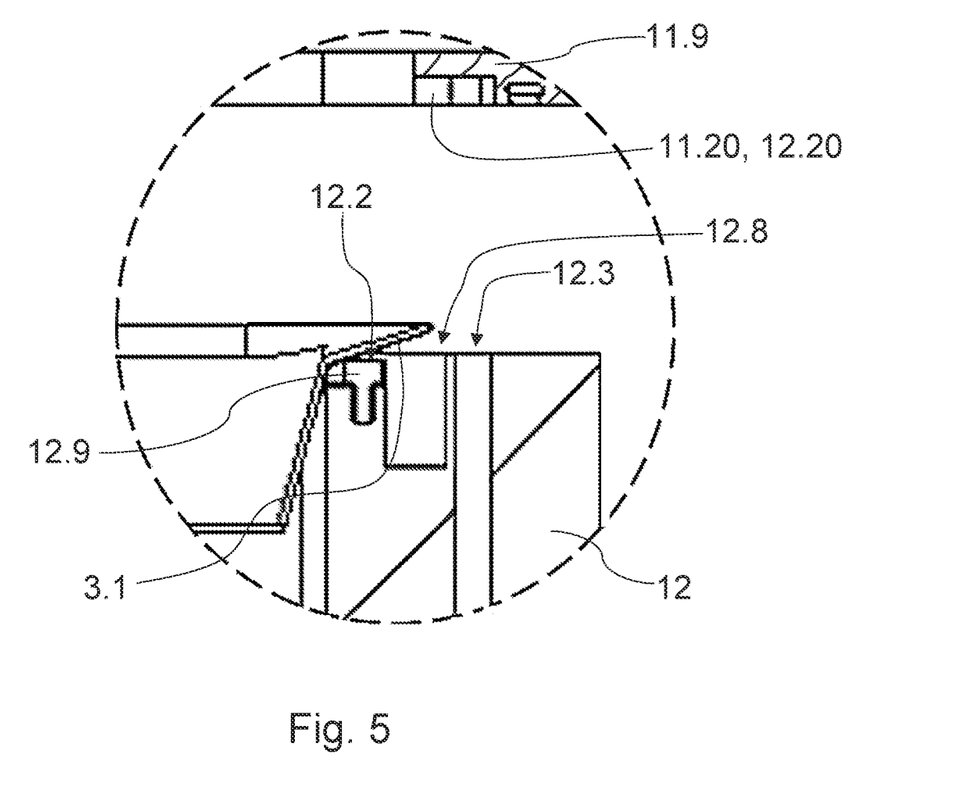
FIG. 5 shows detail B-B of FIG. 4.
Figure 6:
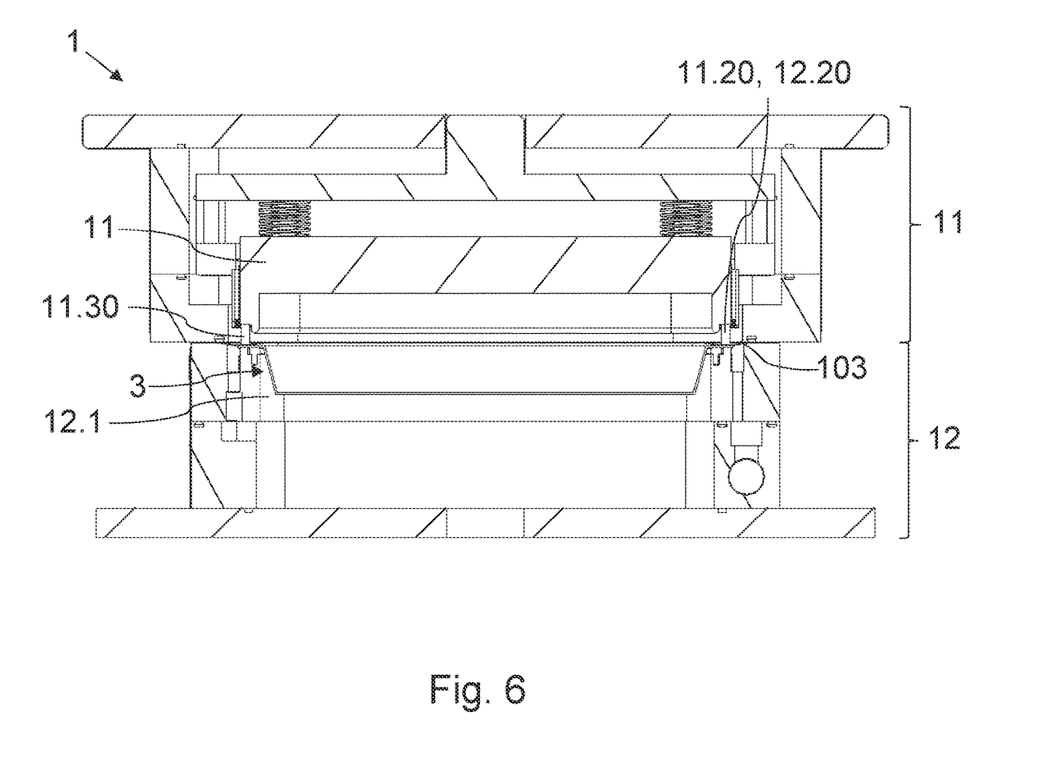
FIG. 6 shows a front section view of a mold of another embodiment of the packaging machine of the invention, with the mold in an operative position.

The sealing station 101 comprises a mold 1 with an upper tool 11 and a lower tool 12 facing each other and suitable for cooperating with one another in an operative position of the mold 1 as shown by way of example in FIGS. 2 and 6. When the tools 11 and 12 cooperate with one another, there is delimited between both tools 11 and 12 an inner area 102 having a given perimeter 103. The perimeter 103 corresponds with the innermost region where both tools 11 and 12 contact one another for holding the cover film 2 or with the innermost region where both tools 11 and 12 contact one another (in the event that the cover film 2 is held above the contact region between said tools 11 and 12).

The machine 100 comprises a film feeding device 104 for supplying the cover film 2 to the sealing station 101, and said cover film 2 is held by the mold 1 when said mold 1 is in the operative position (see FIGS. 2 and 6).

The upper tool 11 comprises a sealing tool 11.1 movable between a sealing position and an inoperative position when the mold 1 is in the operative position, the sealing tool 11.1 being closer to the lower tool 12 when it is in the sealing position.

The lower tool 12 comprises at least one cavity 12.1 sized for receiving the body of the tray 3.0. The cavity includes a plurality of sides and faces the upper tool 11. The lower tool 12 comprises at least one gas injection opening 12.3 arranged outside the cavity 12.1, adjacent to a first side L1 of said cavity 12.1 and communicated with the inner area 102 when the mold 1 is in the operative position.

The upper tool 11 further comprises at least one actuator device 12.20, 12.21 which is closer to the lower tool 12 than the sealing tool 11.1 is when the mold 1 in said operative position and the sealing tool 11.1 in the inoperative position. The actuator device faces at least one point of an actuation region 12.8 of the lower tool 12 defined between the first side L1 of the cavity 12.1 and a first segment 103.1 of the perimeter 103 of the inner area 102. The first segment of the perimeter 103 faces in a direction towards the first side L1 of the cavity 12.1. The flap 3.1 of the tray 3 is arranged on the actuation region 12.8 of the lower tool 12, outside the cavity 12.1 and around said cavity 12.1, such that the actuator device is facing said flap 3.1 and acts on said flap 3.1 either way, based on the embodiment of the machine 100 as described below, in order to prevent the flap 3.1 from closing the communication between the injection opening 12.3 and the cavity 12.1. In any of the embodiments, the function of the actuator device is to keep the communication between the injection opening 12.3 and the cavity 12.1 enabled when required, and it does so by acting on the flap 3.1 in order to prevent said flap 3.1 from blocking said communication. The actuation may be by either pushing the flap 3.1 or else by preventing the flap from moving upwards beyond a contact point with the actuator device.

As will be described below, the actuation region 12.8 may be extended in a horizontal plane, may be formed by segments that are not part of the same horizontal plane, or may be formed by different segments where not all the segments are horizontal.

For sealing the cover film 2 to the flap 3.1 of the tray 3 arranged in the cavity 12.1 of the lower mold 12 the sealing tool 11.1 is caused to move from the inoperative position to the sealing position, with the mold 1 in the operative position. The movement of the sealing tool to the sealing position causes the sealing tool 11.1 to press [the cover film 2 against the flap 3.1. At the same time, this causes the flap 3.1 to press against the lower tool 12. The sealing station 101 comprises heating means (not depicted in the figures) configured for heating the sealing tool 11.1, such that when the sealing tool 11.1 is in the sealing position it heats the cover film 2 which adheres to the flap 3.1 by heat.

The machine 100 is suitable for performing modified atmosphere packaging, such that the sealing station 101 comprises means for injecting a gas into the tray 3 once it is housed in the cavity 12.1 and before sealing the cover film 2 to the flap 3.1 of said tray 3. The means for injecting gas comprises at least one gas chamber (not depicted in the figures) housing pressurized gas, from which gas is injected into the tray 3, and a control device (not depicted in the figures) for controlling said injection of gas. The control device also controls the movement of the sealing tool 11.1 and is configured for causing said sealing tool 11.1 to move to the sealing position after the gas is injected into the tray 3. The control device may be a device specific for these functions, which may be a microcontroller, a controller, a microprocessor, an FPGA, or any other type of device with computing capability, or it may be integrated in a control unit of the machine 100. The gas chamber is communicated with the injection opening 12.3 such that the gas which is injected exits through said injection opening 12.3 towards the tray 3 housed in the cavity 12.1.

In the event that the lower tool 12 comprises a plurality of cavities 12.1, said lower tool 12 comprises at least one injection opening 12.3 for each cavity 12.1. Furthermore, the lower tool 12 comprises at least one actuator device associated with each cavity 12.1. The corresponding actuator device of each cavity 12.1 facing at least one point of an actuation region of the lower tool 12 defined between the first side L1 of the corresponding cavity 12.1 and a segment of the perimeter 103 of the inner area 102 facing said first side L1 when the mold is in the operative position. Each actuator device is closer to the lower tool 12 than the sealing tool 11.1 with the mold 1 in said operative position and with said sealing tool 11.1 in the inoperative position. The cavities 12.1 are arranged such that each of them is adjacent to a segment of the perimeter 103. The gas chamber may be connected to all the injection openings 12.3 for injecting gas simultaneously and with one and the same operation in all the trays 3 housed in said cavities 12.1.

The first side L1 of the cavity 12.1 comprises a given length in a given direction D, and the actuator device 12.20 is facing the actuation region 12.8 of the lower tool 12 along part of said actuation region in the given direction D. Therefore, as the entire length of said actuation region in said given direction D is not encompassed, without the tray residing in the cavity 12.1 and when the mold 1 is in the operative position and the sealing tool 11.1 is in the inoperative position, the cavity 12.1 and the injection opening 12.3 are communicated through said first side L1, the flow of gas from said injection opening 12.3 to said cavity 12.1 being allowed.

The actuator device 12.20, 12.21 may be configured for facing a plurality of points and/or areas of the actuation region 12.8 of the lower tool 12, along part of said actuation region in the given direction D, with said points and/or areas being separated from one another in said given direction D. It can therefore be ensured to a greater extent that the flap 3.1 does not prevent communication between the injection opening 12.3 and the cavity 12.1.

The lower tool 12 comprises a flap support surface 12.2 in the actuation region that is substantially horizontal (extending in a horizontal plane) surrounding the cavity 12.1 and being configured for supporting at least part of the flap 3.1 of a tray 3 housed in said cavity 12.1. The actuator device 12.20 is preferably configured for causing the flap 3.1 to be located in the horizontal position at least partially supported in said flap support surface 12.2 when the mold 1 is in the operative position and the sealing tool 11.1 is in the inoperative position, such that said actuator device is very close to and above the horizontal plane of the flap support surface 12.2. The actuator device is therefore slightly spaced from said horizontal plane for causing the flap 3.1 arranged between the actuation region and said actuator device to be kept substantially horizontal. Preferably, slightly spaced must be interpreted as a maximum distance of 2 mm, which corresponds with the maximum thickness of the flaps 3.1. The horizontal arrangement of the flap 3.1 is thereby ensured at all times, improving the flow of gas towards the inside of the tray 3 and reducing the occurrence of creases in the resulting package. The actuator device 12.20 acts in these cases on the flap 3.1 in order to force its horizontal positioning and/or in order to prevent it from losing its horizontal positioning.

In some embodiments the flap support surface 12.2 extends from the cavity 12.1 to the perimeter 103 of the inner area 102, such that it is configured for supporting the entire flap 3.1. In said configurations the actuation region 12.8 corresponds with said flap support surface 12.2.

In other embodiments, the flap support surface 12.2 extends across only part of the actuation region. In such a case the lower tool 12 comprises at least one channel 12.5 adjacent the support surface 12.2. In the embodiments where the lower tool 12 comprises a channel 12.5 adjacent the flap support surface 12.2, depending on the size of the flap 3.1, said flap 3.1 can be supported on the flap support surface 12.2 or part of said flap 3.1 can be located above the channel 12.5. In some cases the channel 12.5 can reach up to the perimeter 103 of the inner area 102, although in other cases the lower tool 12 may comprise an additional surface between said channel 12.5 and said perimeter 103. In such instances, the actuation region 12.8 further comprises the additional surface. In these embodiments, the actuation region comprises a segment corresponding with the flap support surface 12.2, another segment corresponding with the base of the channel 12.5 and, in the event that the lower tool 12 comprises the additional surface, the actuation region comprises another additional segment corresponding with said additional surface.

In any of the embodiments, the lower tool 12 preferably comprises a gasket 12.9 as part of the support surface 12.2, on which the sealing tool 11.1 is supported when it is moved to the sealing position.

In the embodiments in which the lower tool 12 comprises a channel 12.5, the actuator device 12.20 may be facing a base surface of the channel 12.5, where it can thereby be partially housed in said channel 12.5 or preferably above said channel 12.5.

The gas injection opening 12.3 may be in the support surface 12.2, in the channel 12.5 or even in the additional surface. When located in the channel 12.5, the gas injection opening 12.3 may furthermore face the upper tool 11 with the injection opening being located in the base surface of the channel 12.5. The injection opening 12.3 can also be located in a wall other than the base demarcating the channel 12.5.

The actuator device 12.20 is preferably faces the support surface 12.2, but in the embodiments comprising a channel 12.5, or a channel 12.5 and an additional surface, said actuator device may face the channel 12.5 or said additional surface.

The sealing station 101 comprises a cutting blade 11.7 for cutting the cover film 2, said blade 11.7 surrounding the sealing tool 11.1. The cutting can be generated outside a periphery of the flap 3.1 or above the flap 3.1. An individual package is obtained with this cutting.

In some embodiments of the machine 100, the sealing station 101 comprises a first configuration as the one shown in FIGS. 2 to 5, in which said sealing station 101 is configured to cut the cover film 2 above the flap 3.1 of a tray 3, and before said cover film 2 is sealed to said flap 3.1. This results in the formation of a smaller cover wherein a part of the surface of the flap 3.1 is free of the cover film 2. The blade 11.7 is located between the actuator device and the sealing tool 11.1.

In the first configuration, the upper tool 11 comprises a first body 11.8 and a second body 11.9 that is vertically movable with respect to the first body 11.8. The second body 11.9 faces the lower tool 12 and the first body 11.8 defines an upper cavity where the sealing tool 11.1 is housed. The second body 11.9 comprises a first surface 11.91 which that faces the first body 11.8. The first surface 11.91 is configured to hold the cover film 2 upon the second body 11.9 cooperating with said first body 11.8 such that the cover film 2 is confined between both bodies 11.8 and 11.9, as shown in FIG. 2. The second body 11.9 also includes a second surface 11.92, opposite the first surface 11.91, facing said lower tool 12 and comprising at least one tooth 11.21 or projection. The tooth 11.21 being closer to the lower tool 12 than-the sealing tool 11.1 when the mold 1 is in the operative position and said sealing tool 11.1 is in the inoperative position. In the embodiment of FIG. 2, said tooth 11.21 is the actuator device. Said second surface 11.92 may comprise a plurality of teeth 11.21 separated from one another and distributed in the given direction D.

In other embodiments of the machine 100, the sealing station 101 comprises a second configuration as shown in FIGS. 6 to 9, in which the sealing station 101 is configured to cut the cover film 2 outside of the flap 3.1, with said cutting furthermore being performed once said cover film 2 has been sealed to the flap 3.1 of the tray 3, generating a cover larger than the surface of the flap 3.1 (with part of the cover film 2 being left outside the flap 3.1).

Figure 7:
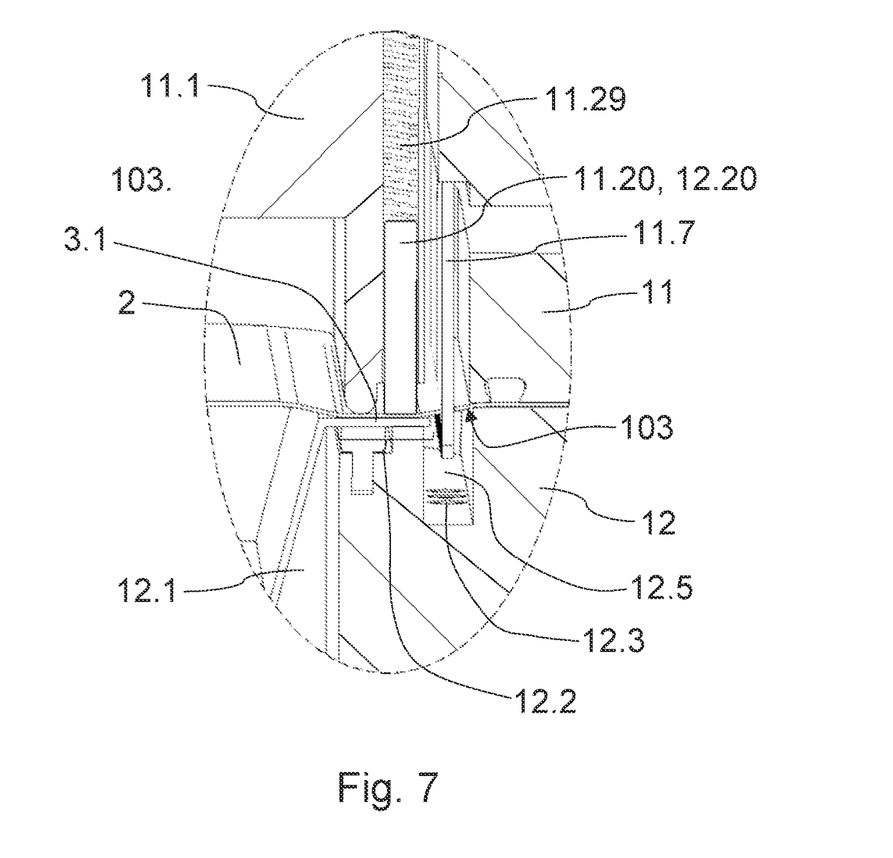
FIG. 7 shows a front section view of a detail of the mold of FIG. 6, with the mold in the operative position.

In the second configuration the actuator device is arranged between the blade 11.7 and the cavity 12.1. The actuator device comprises at least one actuation element 11.20 facing a point or area of the actuation region of the lower tool 12 and being closer to the lower tool 12 than the sealing tool 11.1 when the mold 1 is in the operative position and said sealing tool 11.1 is in the inoperative position, as shown in the example of FIG. 7. The actuation element 11.20 is arranged such that when the mold 1 is in the operative position (FIGS. 6 and 7), said actuation element 11.20 presses the cover film 2 and the flap 3.1 arranged between the upper tool 11 and the lower tool 12 towards the actuation region of the lower tool 12. The actuator device may comprise an elastic element 11.29 associated with the actuation element 11.20, said actuation element 11.20 thereby being attached to the sealing tool 11.1 or to a structure 11.6 of the upper tool 11 through the associated elastic element 11.29 and with freedom of movement.

Figure 8:
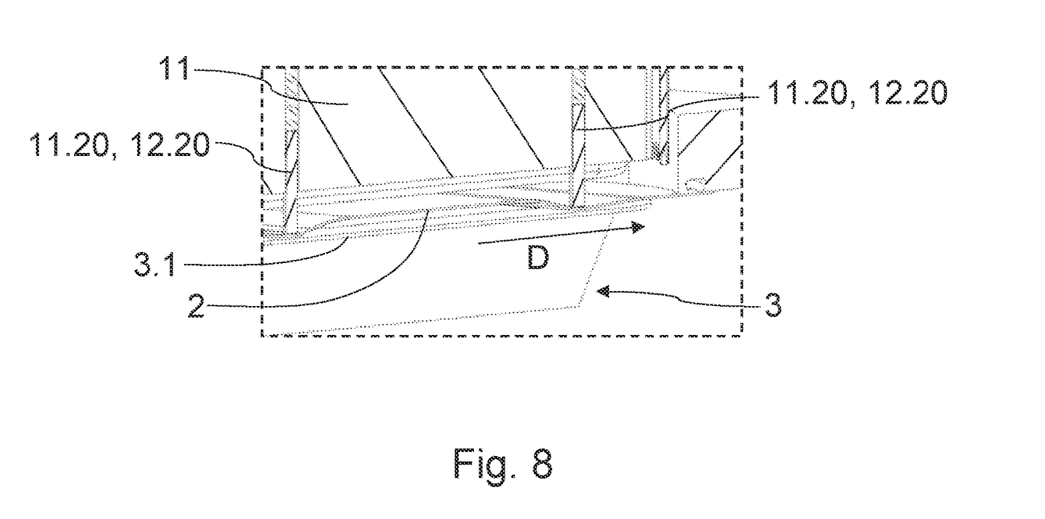
FIG. 8 shows a side section view of a detail of the mold of FIG. 6, without the lower tool of said mold and with the mold in the operative position.
Figure 9:
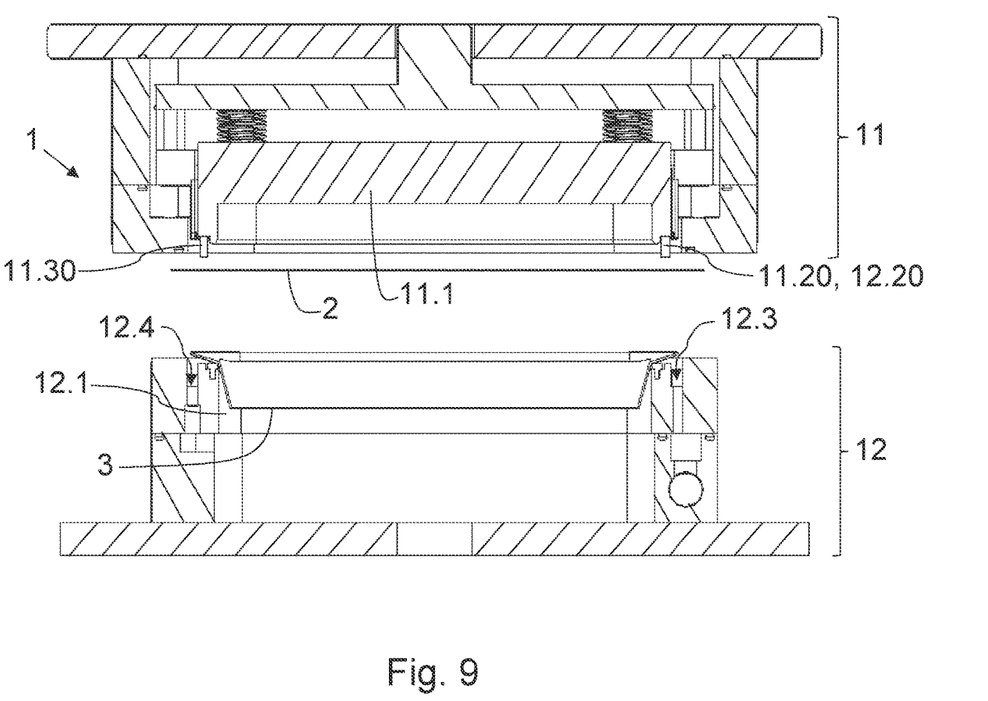
FIG. 9 shows a front section view of the mold of FIG. 6, with the mold in an inoperative position.

The actuator device may comprise a plurality of actuation elements 11.20 distributed along the given direction D and separated from one another, as shown in FIG. 8 by way of example, where two actuation elements 11.20 are shown. As a result of the two actuation elements 11.20, two points of the flap 3.1 are acted on in a way that prevents the flap 3.1 from blocking the communication between the cavity 12.1 and the injection opening 12.3.

In the second configuration, the cover film 2 is confined between the two tools 11 and 12 in order to ensure a correct acting of the cutting blade 11.7 on the cover film 2 and the presence of a pathway for the gas between the injection opening 12.3 and the cavity 12.1 when a gas is injected through said injection opening 12.3 with the sealing tool 11.1 in the inoperative position.

The cavity 12.1 comprises a second side opposite the first side L1, and facing said first side L1. The second side has a length in the direction D, and the machine 100 may comprise in any of its embodiments at least one gas discharge opening 12.4 arranged outside the cavity 12.1 adjacent to said second side of said cavity 12.1. The gas discharge opening being communicated with the inner area 102 when the mold 1 is in the operative position. Therefore, when gas is injected in the cavity 12.1 through the gas injection opening 12.3, the air in the cavity 12.1 can be discharged through the discharge opening 12.4 in order to leave room for the gas entering through the gas injection opening, improving the gas sweep. The machine 100 may comprise a vacuum pump (not depicted in the figures) communicated with the gas discharge opening 12.4 for causing a suctioning of the gas from the cavity 12.1 to facilitate the discharge thereof.

The upper tool 11 may comprise at least one second actuator device which, with the mold 1 in the operative position, faces at least one point of an actuation region of the lower tool 12 defined between the second side of the cavity 12.1 and a second segment of the perimeter 103 of the inner area 102 facing said second side. The second actuator device being closer to the lower tool 12 than the sealing tool 11.1 when the mold 1 is in the operative position and said sealing tool 11.1 is in the inoperative position. The second side of the cavity 12.1 is preferably opposite and facing the first side L1 of the cavity, such that the path of the gas towards the discharge opening 12.4 is facilitated.

The function of the second actuator device is to prevent the flap 3.1 of the tray 3 from closing the communication between the discharge opening 12.4 and the cavity 12.1, acting to that end on said flap 3.1 (either by pushing it downwards or else by preventing it from moving upwards after a certain point). This function is similar to the previously described function of the actuator device 12.20 for the injection opening 12.3. The second actuator device is thus similar to the actuator device associated with the injection opening 12.3 previously described. Therefore, what has been described for the actuator device and the associated actuation region is also valid for said second actuator device and its associated actuation region, in any of the embodiments and/or configurations thereof. In the event the sealing station comprises a first body 11.8 and a second body 11.9, the second surface 11.92 of the second body 11.9 of the upper tool that faces the lower tool 12 serves as both actuator devices. Therefore, the second actuator comprises at least one tooth 11.22 in some embodiments and/or configurations (in which the upper tool 11 comprises two main bodies 11.8 and 11.9), and in other embodiments and/or configurations it comprises at least one actuation element 11.30 similar to the actuation element 11.20 (with its associated elastic element if that were the case).

The actuation region of the lower tool 12 which the second actuator device is facing is defined between the second side of the cavity 12.1 and a segment of the perimeter contour 103 of the inner area 102 delimited between the two tools 11 and 12 and facing said segment, with the mold 1 in the operative position. As the flap 3.1 of the tray 3 surrounds the cavity 12.1, it is arranged on the two actuation regions of the lower tool 12 that have been previously described (the one facing the actuator device and the one facing the second actuator device), such that said second actuator device acts on said flap 3.1 to prevent the flap 3.1 from closing the communication between the discharge opening 12.4 and the cavity 12.1.

A number of aspects of the present disclosure are set out in the following numbered clauses:

Clause 1. Modified atmosphere packaging machine comprising a sealing station (101) with a mold (1) comprising an upper tool (11) and a lower tool (12) facing each other and suitable for cooperating with one another in an operative position of the mold (1), there being delimited an inner area (102) between both tools (11, 12) with a given perimeter (103) with the mold (1) in said operative position, with the upper tool (11) comprising a sealing tool (11.1) movable between a sealing position and an inoperative position when the mold (1) is in the operative position and with the sealing tool (11.1) being closer to the lower tool (12) when it is in the sealing position, with the lower tool (12) comprising at least one cavity (12.1) comprising a plurality of sides, which is facing the upper tool (11) and sized for receiving a tray (3), and with said lower tool (12) further comprising at least one gas injection opening (12.3) arranged outside the cavity (12.1), adjacent to a first side (L1) of said cavity (12.1) and communicated with the inner area (102) when the mold (1) is in the operative position, characterized in that the upper tool (11) comprises at least one actuator device which, with the mold (1) in the operative position, is facing at least one point of an actuation region of the lower tool (12) defined between the first side (L1) of the cavity (12.1) and a first segment of the perimeter (103) of the inner area (102), with said first segment of the perimeter (103) facing said first side (L1) and the actuator device being closer to the lower tool (12) than what the sealing tool (11.1) is when the mold (1) is in the operative position and said sealing tool (11.1) is in the inoperative position.

Clause 2. Packaging machine according to clause 1, wherein the first side (L1) of the cavity (12.1) comprises a given length in a given direction (D), with said actuator device facing the actuation region of the lower tool (12), along part of said actuation region in the given direction (D), such that when the mold (1) is in the operative position and the sealing tool (11.1) is in the inoperative position, the cavity (12.1) and the injection opening (12.3) are communicated through said first side (L1), with the flow of gas from said injection opening (12.3) to said cavity (12.1) being allowed.

Clause 3. Packaging machine according to clause 1, wherein the actuator device is configured for facing a plurality of points and/or areas of the actuation region of the lower tool (12), along part of said actuation region in the given direction (D), with said points and/or areas being separated from one another in said given direction (D).

Clause 4. Packaging machine according to any of clauses 1 to 3, wherein the lower tool (12) comprises a support surface (12.2) in the actuation region extending in a horizontal plane and surrounding the cavity (12.1) and being configured for supporting at least part of the flap (3.1) of a tray (3) housed in said cavity (12.1), with the actuator device (12.2) being above said horizontal plane and slightly spaced from said horizontal plane for causing a flap (3.1) of a tray (3) arranged between the actuation region and said actuator device to be kept substantially horizontal.

Clause 5. Packaging machine according to any of clauses 1 to 4, wherein the actuator device comprises at least one actuation element (11.20) facing a point or area of the actuation region of the lower tool (12) and being closer to the lower tool (12) than what the sealing tool (11.1) is when the mold (1) is in the operative position and said sealing tool (11.1) is in the inoperative position.

Clause 6. Packaging machine according to clause 5, wherein the actuation element (11.20) is arranged such that when the mold (1) is in the operative position, said actuation element (11.20) presses the cover film (2) and the flap (3.1) arranged between the upper tool (11) and the lower tool (12) towards the actuation region of the lower tool (12).

Clause 7. Packaging machine according to clause 6, wherein the actuator device comprises an elastic element (11.29) associated with the actuation element (11.20), the actuation element (11.20) being attached to the sealing tool (11.1) or to a structure (11.6) of the upper tool (11) through the associated elastic element (11.29).

Clause 8. Packaging machine according to any of clauses 5 to 7, wherein the upper tool (11) comprises a blade (11.7) surrounding the sealing tool (11.1), the actuator device being arranged between the blade (11.7) and the cavity (12.1), and when the mold (1) is in the operative position and said sealing tool (11.1) is in the inoperative position, the actuator device being closer to the lower tool (12) than what the blade (11.7) is.

Clause 9. Packaging machine according to any of clauses 5 to 8, wherein the actuator device comprises a plurality of actuation elements (11.20) distributed along the given direction (D) and separated from one another, each of said actuation elements (11.20) being closer to the lower tool (12) than what the sealing tool (11.1) is when the mold (1) is in the operative position and said sealing tool (11.1) is in the inoperative position.

Clause 10. Packaging machine according to any of clauses 1 to 4, wherein the upper tool (11) comprises a first body (11.8) and a second body (11.9) vertically movable with respect to the first body (11.8) and facing the lower tool (12), with the first body (11.8) defining an upper cavity (11.7) where the sealing tool (11.1) is housed and the second body (11.9) comprising a first surface which is facing the first body (11.8) for holding a cover film (2) upon cooperating with said first body (11.8), and a second surface facing said lower tool (12) and comprising at least one tooth (11.21), said tooth (11.21) being closer to the lower tool (12) than what the sealing tool (11.1) is when the mold (1) is in the operative position and said sealing tool (11.1) is in the inoperative position such that said tooth (11.21) is the actuator device.

Clause 11. Packaging machine according to clause 10, wherein the upper tool (11) comprises a blade (11.7) surrounding the sealing tool (11.1), said blade (11.7) being arranged between the actuator device (11.2) and said sealing tool (11.1), and when the mold (1) is in the operative position and said sealing tool (11.1) is in the inoperative position, the actuator device (11.2) being closer to the lower tool (12) than what the blade (11.7) is and the blade (11.7) being closer to the lower tool (12) than what the sealing tool (11.1) is.

Clause 12. Packaging machine according to clause 10 or 11, wherein the surface of the second body (11.9) which is facing the lower tool (12) comprises a plurality of teeth (11.21) distributed along the given direction (D) and separated from one another in said given direction (D), each of the teeth (11.21) being closer to the lower tool (12) than what the sealing tool (11.1) is when the mold (1) is in the operative position and said sealing tool (11.1) is in the inoperative position.

Clause 13. Packaging machine according to any of clauses 10 to 12, wherein the cavity (12.1) comprises a second side opposite the first side (L1), of a given length in the given direction (D), and at least one gas discharge opening (12.4) arranged outside the cavity (12.1), adjacent to said second side of said cavity (12.1) and communicated with the inner area (102) when the mold (1) is in the operative position, with the upper tool (11) comprising at least one second actuator device which, with the mold (1) in the operative position, is facing at least one point of an actuation region of the lower tool (12) defined between the second side of the cavity (12.1) and a second segment of the perimeter (103) of the inner area (102) facing said second side, and being closer to the lower tool (12) than what the sealing tool (11.1) is when the mold (1) is in the operative position and said sealing tool (11.1) is in the inoperative position.

Clause 14. Packaging machine according to clause 13, wherein the second body (11.9) of the upper tool (11) comprises the actuator device and the second actuator device, said body (11.9) comprising at least one respective tooth (11.21, 11.22) for each actuator device facing the corresponding actuation region of the lower tool (12).

Clause 15. Packaging machine according to any of clauses 1 to 12, wherein the cavity (12.1) comprises a second side opposite the first side (L1), of a given length in the given direction (D), and at least one gas discharge opening (12.4) arranged outside the cavity (12.1), adjacent to said second side of said cavity (12.1) and communicated with the inner area (102) when the mold (1) is in the operative position, with the upper tool (11) comprising at least one second actuator device which, with the mold (1) in the operative position, is facing at least one point of an actuation region of the lower tool (12) defined between the second side of the cavity (12.1) and a second segment of the perimeter (103) of the inner area (102) facing said second side, and being closer to the lower tool (12) than what the sealing tool (11.1) is when the mold (1) is in the operative position and said sealing tool (11.1) is in the inoperative position.

What is claimed is:

1. A modified atmosphere packaging machine comprising:
a sealing station that includes a mold;
the mold comprising an upper tool and a lower tool that face one another and are configured to cooperate with one another in an operative position of the mold, there being delimited an inner area between the upper and lower tools when the mold is in the operative position;
the upper tool including a sealing tool movable between a sealing position and an inoperative position when the mold is in the operative position, the sealing tool being located a first distance from the lower tool when in the sealing position and being located a second distance from the lower tool when in the inoperative position, the first distance being less than the second distance;
the lower tool including a cavity sized to receive a tray having a flap, the lower tool including a first flap support surface that faces the upper tool and is configured to support a first portion of the flap when the tray is housed in the cavity, the lower tool including a first gas injection opening arranged outside the cavity, the first flap support surface being located between the first gas injection opening and the cavity;
the upper tool including a first actuator device located in the inner area above the first flap support surface of the lower tool, the first actuator device configured to act on the flap of the tray when the tray is located in the cavity of the lower tool to press the first portion of the flap against the first flap support surface while permitting the first gas injection opening to communicate with the inner area when the mold is in the operative position.

2. The packaging machine according to claim 1, wherein the first gas injection opening is located on a first side of the cavity, the first side of the cavity having a length in a first direction, when the tray is located in the cavity of the lower tool the first actuator device faces the flap of the tray along the first direction, such that when the mold is in the operative position and the sealing tool is in the inoperative position, the cavity and the first gas injection opening are communicate through the first side of the cavity to permit a flow of gas from the first gas injection opening to the cavity.

3. The packaging machine according to claim 1, wherein the first actuator device is configured to press multiple portions of the flap the multiple portions being separated from one another.

4. The packaging machine according to claim 1, wherein the first flap support surface is in a horizontal plane and surrounding the cavity, the first actuator device being located above the horizontal plane and spaced from the horizontal plane to cause the flap arranged between the first flap support surface and the first actuator device to be maintained substantially horizontal.

5. The packaging machine according to claim 4, wherein the first actuator device is spaced above the horizontal plane by a distance of no more than 2 millimeters.

6. The packaging machine according to claim 1, wherein the first actuator device is closer to the lower tool than the sealing tool when the mold is in the operative position and the sealing tool is in the inoperative position.

7. The packaging machine according to claim 6, wherein the sealing tool is configured to adhere a cover film to the flap of the tray when the tray is located in the cavity of the lower tool, the first actuator device being arranged such that when the mold is in the operative position, the first actuator device is configured to press the cover film and the flap arranged between the upper tool and the lower tool towards the first flap support surface of the lower tool.

8. The packaging machine according to claim 7, wherein the first actuator device is attached to the sealing tool or to a structure of the upper tool through an elastic element.

9. The packaging machine according to claim 1, wherein the upper tool comprises a blade surrounding the sealing tool, the first actuator device being arranged between the blade and the cavity and being closer to the lower tool than the blade when the mold is in the operative position and the sealing tool is in the inoperative position.

10. The packaging machine according to claim 1, wherein the first actuator device comprises a plurality of spaced-apart actuation elements that each face the flap of the tray when the tray is located in the cavity of the lower tool, each of the plurality of spaced-apart actuation elements being closer to the lower tool than the sealing tool when the mold is in the operative position and the sealing tool is in the inoperative position.

11. The packaging machine according to claim 1, wherein the upper tool comprises a first body and a second body, the second body being vertically movable with respect to the first body and facing the lower tool, the first body defining an upper cavity in which the sealing tool is housed, the second body including a first side having a surface that faces the first body and configured to hold a cover film upon cooperating with the first body, the second body including a second side opposite the first side that faces the lower tool, the first actuator device comprising at least one projection extending from the second side of the second body.

12. The packaging machine according to claim 11, wherein the upper tool comprises a blade surrounding the sealing tool, the blade being arranged between the first actuator device and the sealing tool, and when the mold is in the operative position and the sealing tool is in the inoperative position, the first actuator device is closer to the lower tool than the blade and the blade is closer to the lower tool than the sealing tool.

13. The packaging machine according to claim 1, wherein the upper tool comprises a first body and a second body, the second body being vertically movable with respect to the first body and facing the lower tool, the first body defining an upper cavity in which the sealing tool is housed, the second body including a first side having a surface that faces the first body and configured to hold a cover film upon cooperating with the first body, the second body including a second side opposite the first side that faces the lower tool, the first actuator device comprising a plurality of spaced-apart projections that each extend from the second side of the second body.

14. The packaging machine according to claim 1, wherein the cavity includes a first side and a second side opposite the first side, the first gas injection opening being located on the first side of the cavity;

the lower tool including a second flap support surface that faces the upper tool and is configured to support a second portion of the flap when the tray is housed in the cavity and the mold is in the operative position, the lower tool including a second gas injection opening arranged outside the cavity, the second flap support surface being located between the second gas injection opening and the cavity, the second gas injection opening being located on the second side of the cavity;

the upper tool including a second actuator device located in the inner area above the second flap support surface of the lower tool, the second actuator device configured to act on the flap of the tray when the tray is located in the cavity of the lower tool to press the second portion of the flap against the second flap support surface while permitting the second gas injection opening to communicate with the inner area when the mold is in the operative position.

15. The packaging machine according to claim 14, wherein the upper tool comprises a first body and a second body, the second body being vertically movable with respect to the first body and facing the lower tool, the first body defining an upper cavity in which the sealing tool is housed, the second body including a first side having a surface that faces the first body and configured to hold a cover film upon cooperating with the first body, the second body including a second side opposite the first side that faces the lower tool, the first actuator device comprising a first one or more projections extending from the second side of the second body that is configured to face the flap of the tray when the tray is located in the cavity of the lower tool.

16. The packaging machine according to claim 15, wherein the second actuator device comprises a second one or more projections extending from the second side of the second body that is configured to face the flap of the tray when the tray is located in eh cavity of the lower tool.

* * * * *

UNITED STATES PATENT AND TRADEMARK OFFICE
CERTIFICATE OF CORRECTION

| | |
|---|---|
| PATENT NO. | : 11,708,185 B2 |
| APPLICATION NO. | : 17/519972 |
| DATED | : July 25, 2023 |
| INVENTOR(S) | : Ugarte Carcoba et al. |

It is certified that error appears in the above-identified patent and that said Letters Patent is hereby corrected as shown below:

In the Specification

Column 2, Line 9, after given perimeter delete "contour".

Column 2, Line 9, after The perimeter delete "contour".

Column 2, Line 43, after than delete "what".

Signed and Sealed this
Twenty-eighth Day of November, 2023

Katherine Kelly Vidal
*Director of the United States Patent and Trademark Office*